Sept. 17, 1940.   H. J. GALEY   2,215,214
PROCESS OF FORMING CERAMIC BODIES
Filed Dec. 16, 1938   5 Sheets-Sheet 1
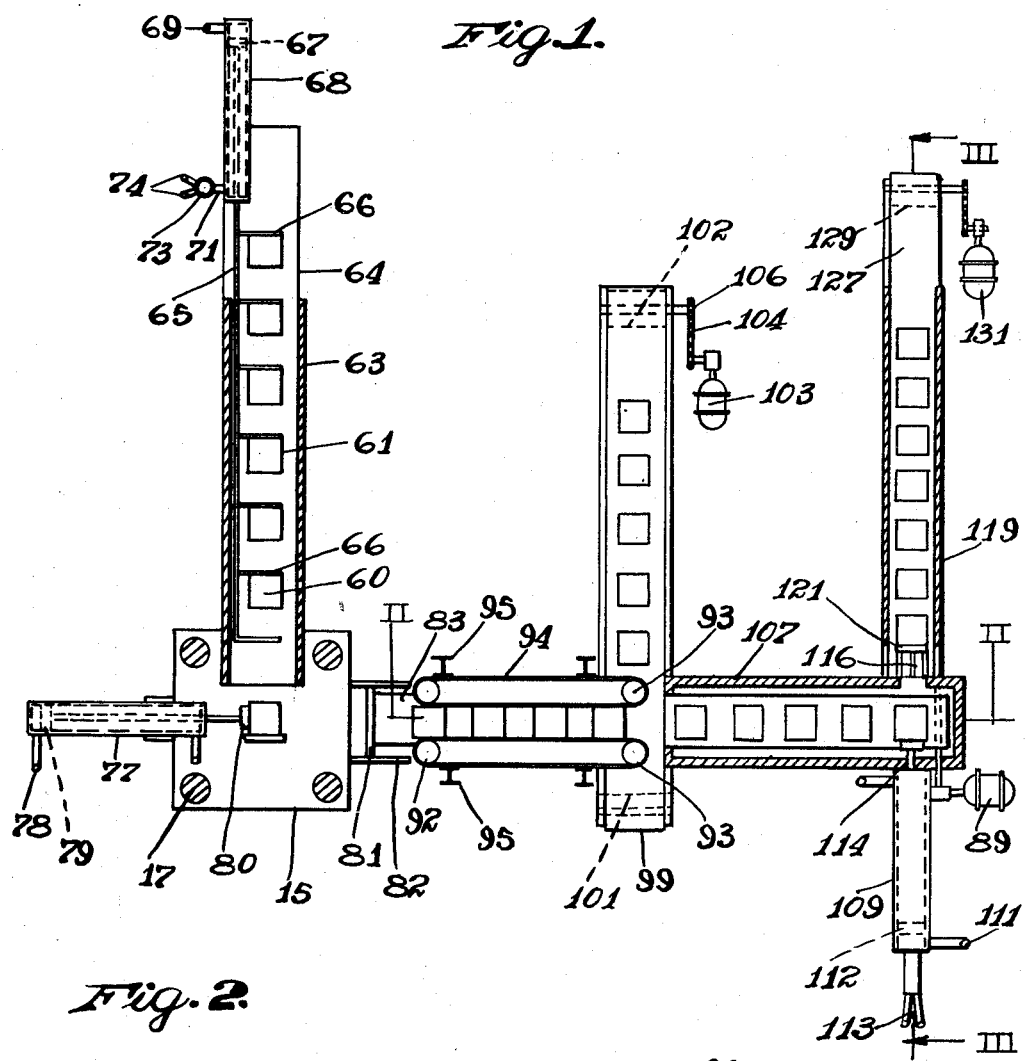
INVENTOR.
HENRY J. GALEY.
BY Bradley & Bee
ATTORNEYS.

Sept. 17, 1940.   H. J. GALEY   2,215,214
PROCESS OF FORMING CERAMIC BODIES
Filed Dec. 16, 1938   5 Sheets-Sheet 2

INVENTOR.
HENRY J. GALEY.
BY Bradley & Bee
ATTORNEYS.

Sept. 17, 1940.     H. J. GALEY     2,215,214
PROCESS OF FORMING CERAMIC BODIES
Filed Dec. 16, 1938     5 Sheets-Sheet 3

INVENTOR.
HENRY J. GALEY.
BY Bradley & Bee
ATTORNEYS.

INVENTOR.
HENRY J. GALEY.
BY Bradley & Bee
ATTORNEYS.

Sept. 17, 1940.  H. J. GALEY  2,215,214
PROCESS OF FORMING CERAMIC BODIES
Filed Dec. 16, 1938  5 Sheets-Sheet 5
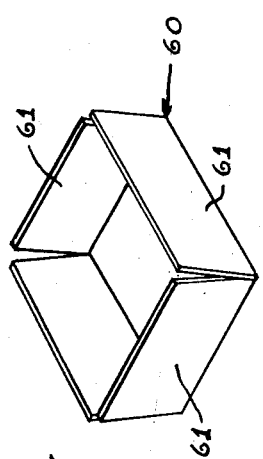
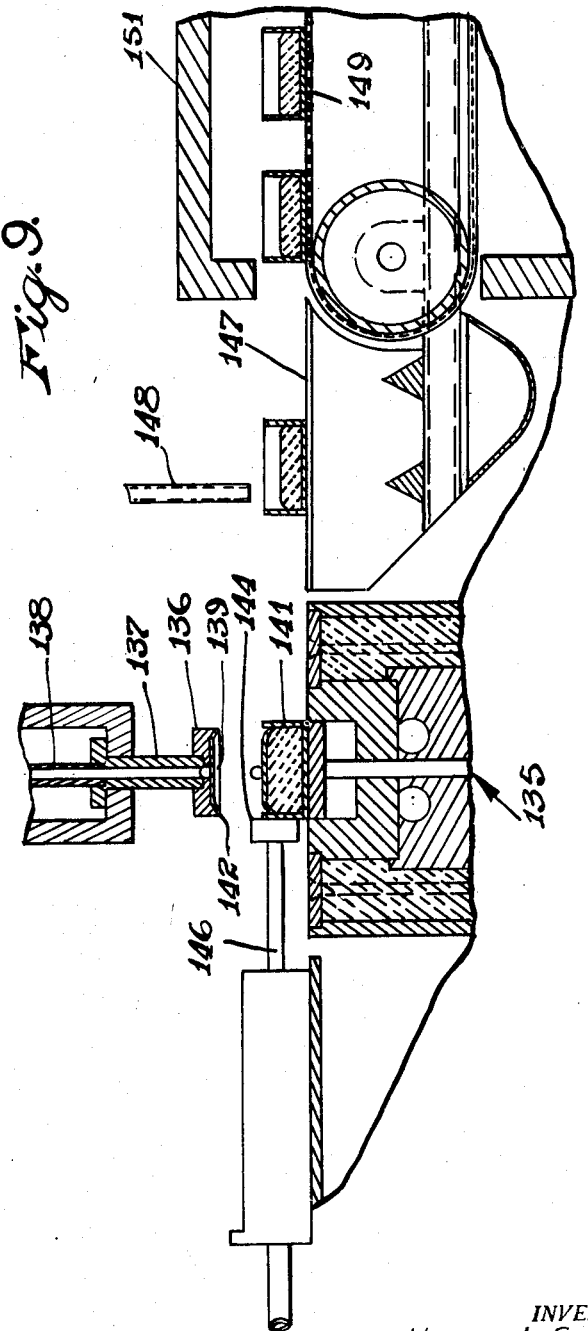
INVENTOR.
HENRY J. GALEY.
BY Bradley & Bee
ATTORNEYS.

UNITED STATES PATENT OFFICE 2,215,214

PROCESS OF FORMING CERAMIC BODIES

Henry J. Galey, Tarentum, Pa., assignor to Norbert S. Garbisch, Butler, Pa.

Application December 16, 1938, Serial No. 246,166

6 Claims. (Cl. 49—85)

The present invention relates to processes of converting waste sands from the grinding of glass into useful products and it has particular relation to a process of forming structural bricks, tiles and similar bodies from the above described material.

One object of the invention is to provide a process of the foregoing type by use of which the waste sand in loose or pulverulent form can be preheated to a temperature admitting of compression into coherent masses and can then be introduced into a suitable press and immediately subjected to strong pressure, in order to consolidate it into strongly coherent state.

This and other objects of the invention will be apparent from consideration of the following specification and claims.

It has heretofore been the practice in the grinding and polishing of glass, to cement plates thereof to the top of movable cars or tables and then to pass them under revolving cast iron discs termed runners, which were supplied with a water suspension of sand as an abrasive. Gradually the surfaces of the plates were abraded away to a uniform level and simultaneously the particles of sand were broken into finer and finer state until, ultimately, a very intimate mixture of extremely fine (about 5-20 micron) particles of silica and glass was obtained. This mixture contained about 10-25 per cent of glass, the rest being mainly finely divided silica (about 75-80 per cent), 1 or 2 per cent of metallic iron, a small amount of gypsum from the plaster employed as a cement and minor amounts of other ingredients. Because of its fine state of division and for other reasons the mixture has heretofore been discarded as being of no value.

Recently it has been suggested that the mixture might be heated to the sintering point of the glass particles contained therein and then subjected to a pressing operation in a suitable mold. Under pressure, the particles of sintered glass are pressed against and become bonded to the particles of silica to form dense coherent bodies suitable for use as structural tiles, bricks, filter plates and the like.

In the operation of pressing the waste sand, it is necessary that the material be heated above the sintering temperature of the glass and preferably to a temperature of about 1600 to 1700 degrees F. This, of course, cannot conveniently be done within reasonable time in the press. Therefore, it is desirable to preheat the material to or preferably somewhat above the optimum pressing temperature before introducing it into the press molds. Considerable difficulty is encountered in the operation because of the peculiarities of the material. For example, it exhibits a tendency when heated above 1000 or 1200 degrees F. to coalesce or ball up sufficiently that preheated material cannot easily be poured in pulverulent state into the molds. On the other hand the material, unless it is subjected to high pressure, is of but little mechanical strength. Even when strongly heated and under heavy pressure it does not exhibit any substantial degree of mechanical flow. Therefore, it is inconvenient to form it into lumps or tablets which can be preheated and then introduced into the molds for pressing because such bodies are simply pressed down, but do not flow laterally satisfactorily to fill the molds.

In accordance with the provisions of the present invention the foregoing difficulties are substantially obviated by introducing the waste sand in loose, pulverulent form into trays or pans having relatively thin flexible walls and of dimensions such that they completely fill the molds when pressure is applied to the sand therein. In the practice of the invention, the waste sand in the pans can readily be preheated to the working temperature or slightly above, and the pans are then dropped bodily into the molds and the material is immediately subjected to strong pressure in order to compact and consolidate it into coherent bodies of the same outline as the mold.

For a better understanding of the invention reference may now be had to the accompanying drawings in which like numerals refer to like parts throughout and in which Figure 1 is a cross sectional view taken in a horizontal plane through a convenient embodiment of the apparatus.

Figure 2 is a fragmentary cross-sectional view taken substantially upon the line II—II of Figure 1.

Figure 7 is an isometric detail view of a pan suitable for use in the press herein disclosed.

Figure 9 is a fragmentary cross-sectional view showing a modified form of apparatus for applying glaze to the bodies after the pressing operation.

Figure 3:
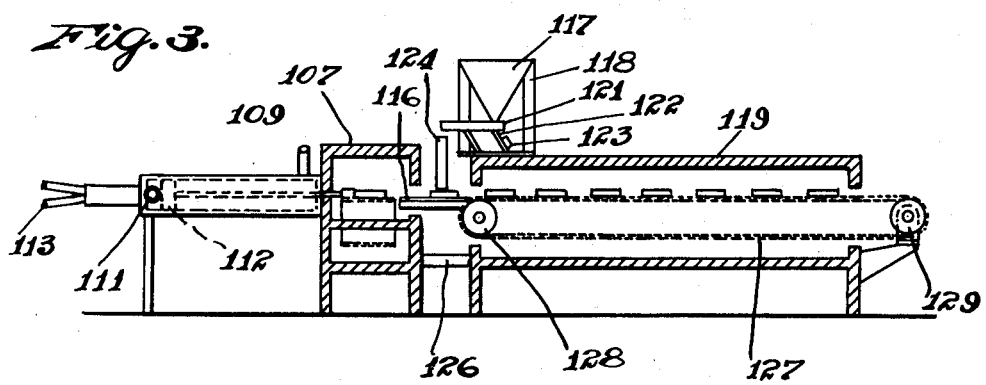
Figure 3 is a cross-sectional view taken in a vertical plane substantially upon the line III—III of Figure 1.

In the form of the invention disclosed in Figures 1 to 8, inclusive, shaping and consolidation of the waste material is effected in a press 15 (shown in Fig. 4) embodying a base 16, having upright guide-rods 17 projecting therefrom, which guide-rods are interconnected at their upper extremities by means of press head 18.

A plurality (2 or more) of pressure cylinders 19 are disposed upon the base 16 and are provided with suitable inlet conduits 21 for actuating fluid. Rams or pistons 22 reciprocate within the cylinders and at their upper extremities are connected to a cross-head 23, or platen, which slides upon the guide-rods 17.

A suitable mold construction for use in the press embodies a base plate 24, resting upon a plate 26 of insulated material, which in turn rests upon the cross-head 23. Displacement of the plates is obviated by means of bolts 27, threaded or otherwise secured in the cross-head. Burner block 28 rests upon plate 24 and as indicated at 29 the upper surface thereof is transversely bored or grooved to provide combustion chambers which are supplied with a combustible mixture by means of tuyères 31. Air and gas in proper proportions are supplied to the tuyères by means of inlet conduits 32 and 33 (shown in Fig. 5). Exhaust gases escape from the combustion chambers through outlet ports or flues 34.

A mold 36, formed of chrome steel or other strong, heat-resistant material, rests upon block 28 and the bottom thereto constitutes the upper portions of the combustion chambers 29. It will be noted that the mold is rabbeted as indicated at 37 to receive the inner edges of a plate 38, the outer edges of which rest upon the upper edge of an enclosing wall 39. Bolts 40 extend through plate 38 and are threaded into plate 24, thus positively clamping the mold in position. The wall 39, at its lower edge, is also provided with outwardly directed flange 41, which is secured by means of bolts 27 to the plate 24. The space between wall 39 and mold 36 may be packed with insulating material indicated at 42.

It will be observed that the bottom of mold 36 is bored to receive a vertical rod or plunger 43, which at its upper extremity is provided with a follower plate 44, for forcing bodies from the molds. At its lower extremity the rod rests upon the head 46 of an adjusting screw 47 which is threaded into a boss 49 upon base 16. For purposes of positively clamping the screw in any desired position of adjustment, it may be provided with a lock-nut 51 which engages with the top of the boss.

Plunger mechanism for compressing material within the mold 36 includes a hollow boss 52 having a lateral base flange 53 which is secured by means of bolts 54 to press head 18. The bottom portion of the boss is bored slidably to receive a rod 56 having at its upper extremity a head 57 designed to prevent complete displacement of the rod. At its lower extremity, rod 56 is provided with a plunger head 58 slightly smaller in cross-sectional outline than the cavity of mold 36, and designed during compression of the material in mold 36 to engage the lower face of boss 52. When the cross-head 23 starts to descend, the plunger drops, thus reducing the flow of heat to the boss and the press-head 18. Plunger 58 is also provided with an upwardly-projecting pin 59 which extends upwardly through a suitable opening in the bottom of boss 52 thereby positively preventing rotation of the head 58 with respect to the mold.

Waste sand in preheated state is introduced into the mold 36 in trays or pans 60, one of which is shown in detail in Figure 7. This pan is formed of strong heat-resistant metal such as a chromium steel and preferably comprises thin flexible side walls 61, the vertical edges of which are left free with respect to each other, in order to permit the walls to spring into contact with the vertical walls of the mold 36 during the pressing operation. Material within the pans is covered by plates 62 fitting slidably within the sides 61.

Figure 8:
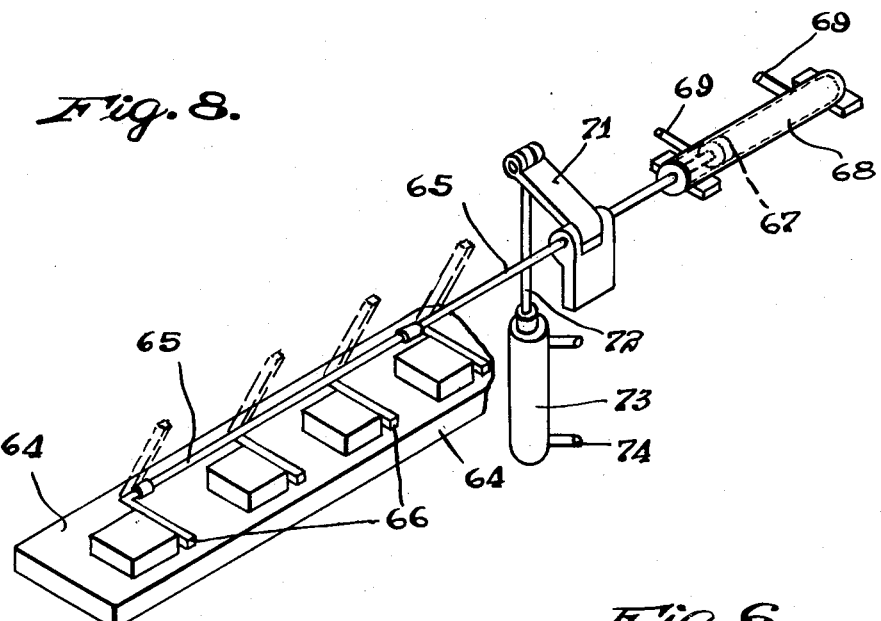
Figure 8 is an isometric detail view of a feeder mechanism for supplying trays of preheated material to the press.
Figure 6:
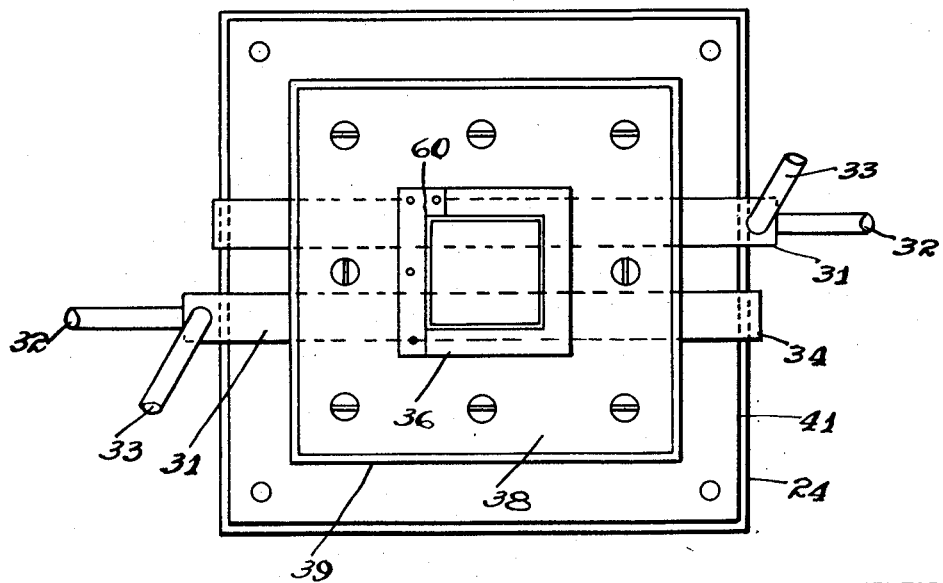
Figure 6 is a detail plan view of the mold employed in the press shown in Figure 4.

Apparatus for preheating the sand in the pans 60 and feeding the pans containing the preheated material to the molds includes a tunnel kiln 63 best shown in Figure 1. As shown in Figure 8 the pans are slid in steps along a bottom plate 64 of the kiln by means of mechanism which includes a rod 65, preferably extending the entire length of the kiln. This rod is provided with laterally-extending arms 66 designed to engage the rear edges of the pans. At its rear extremity, the rod is provided with a piston head 67 reciprocating within a cylinder 68, having inlet conduits 69 for fluid under pressure. The stroke of this piston is so regulated that pans upon the bottom of the kiln after having been advanced by one of the lateral arms 66 will be engaged by the next succeeding arm during the subsequent stroke of the rod.

Rod 64 is also oscillated about its axis, to lift the arms 66 from the pans during retraction of the rod and subsequently to lower the arms to engage the pans during the working stroke, by means of a side arm 71, which is splined thereupon. At its free extremity the arm is joined to vertical piston rod 72, which reciprocates within a cylinder 73, having inlet and outlet conduits 74 for actuating fluid.

Figure 4:
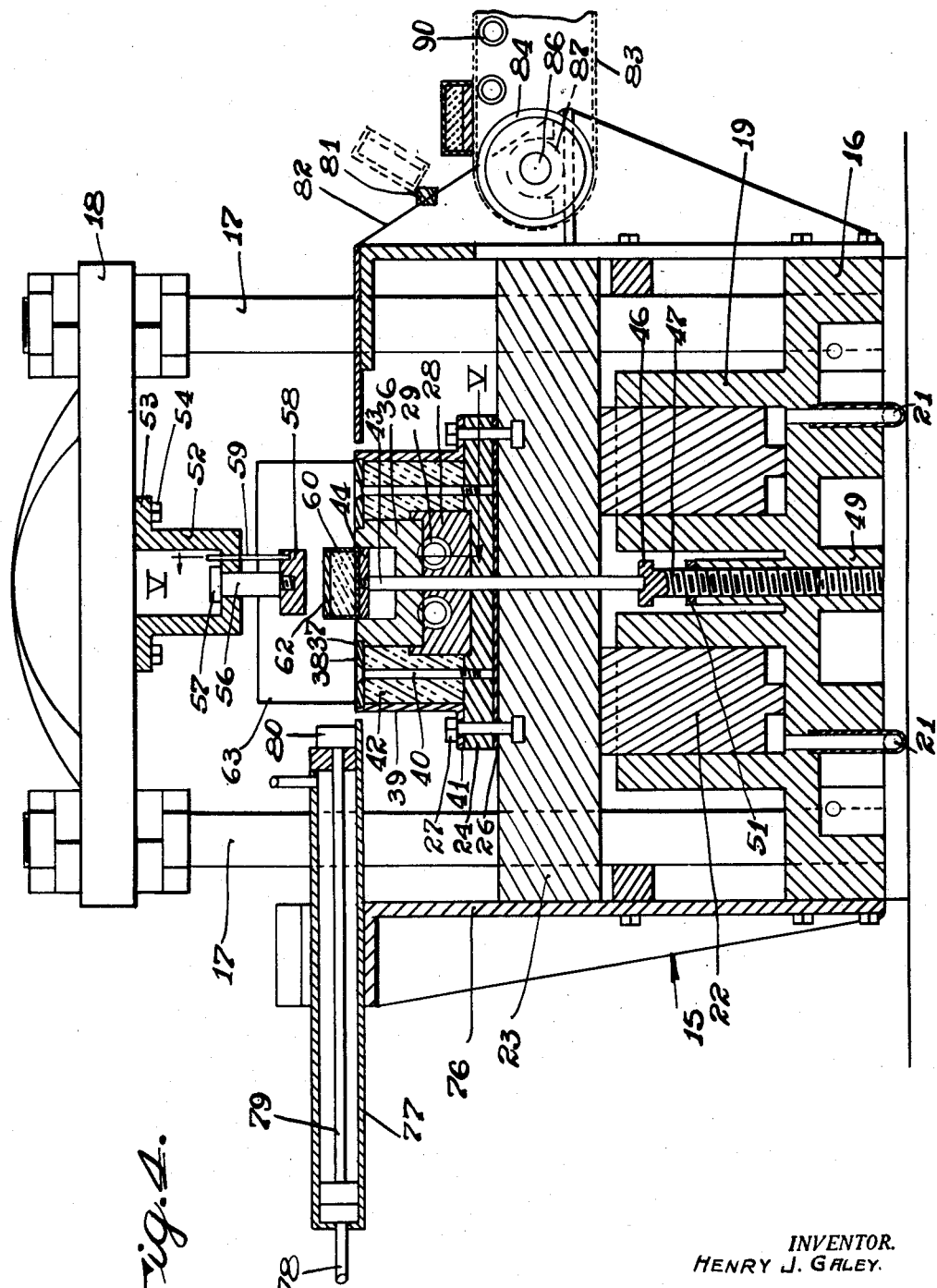
Figure 4 is a fragmentary cross-sectional view showing on a larger scale, a convenient form of press for use in practicing the invention.

As shown in Figure 4, removal of the pans containing the freshly pressed bodies from the follower plate 44 is effected by means of mechanism including an upright member 76 secured to the side of base 16. At its upper extremity this upright is provided with a horizontal cylinder 77 extending perpendicularly with respect to tunnel kiln 63 and rod 65, and having supply conduits 78 for actuating fluid. The cylinder is also provided with a piston rod 79 extending through the forward extremity thereof and having a cross-head 80 adapted, during forward motion, to push the bodies from the follower.

Figure 5:
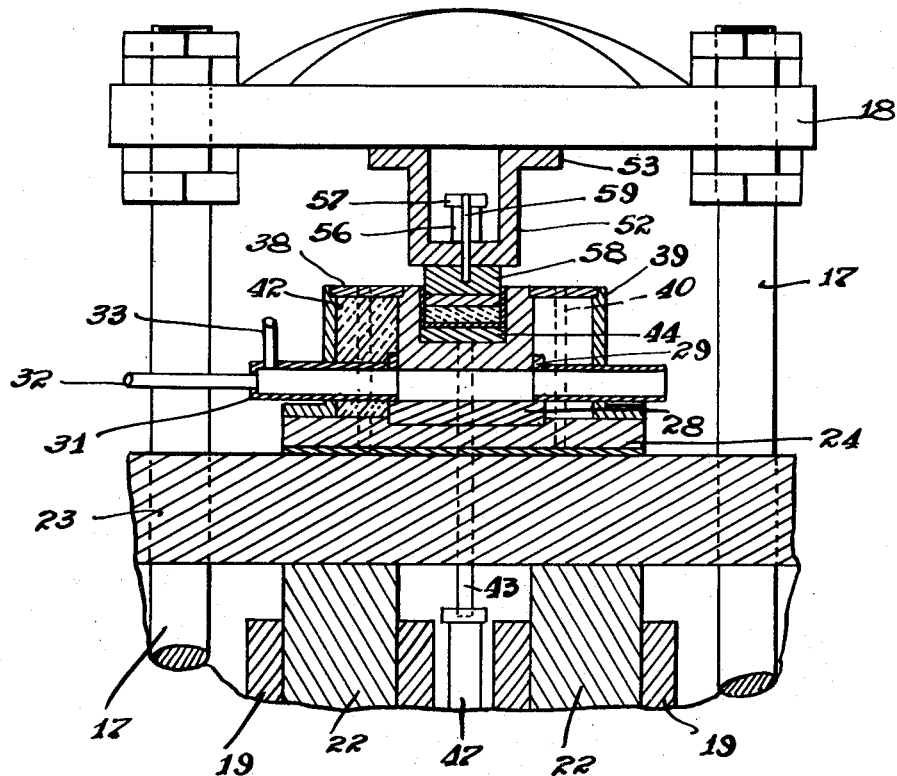
Figure 5 is a fragmentary cross-sectional view substantially upon the line V—V of Figure 4.

A bar 81 is supported by webs 82 secured to an upright 82a upon base 16, opposite upright 76. This bar is disposed below the level of the top of mold 36 in the path of pans 60 as they drop from the press. It will be observed that the corner of the bar engages the corner of the pan and imparts a rotary motion to the latter as it falls. Pans are received in inverted position upon a conveyor 83 preferably formed of heat-resistant material such as chrome steel. This conveyor, at its rear extremity, is trained about a roller 84, provided with a shaft 86, the extremities of which are journaling bearings 87, secured to flanges 82. As shown in Figure 2, the conveyor is further trained about a second roller 88 which is driven by a combined motor and speed-reducing mechanism 89 (best shown in Fig. 1). In Figure 5 it will be observed that one or more conduits 90 are disposed below conveyor 83 in position to direct jets of cold air against the tiles, in order to cool them sufficiently to facilitate immediate release from the pans 60.

As shown in Figures 1 and 2, removal of the pans is effected by mechanism which includes a pair of conveyor belts or chains 91 disposed in slightly inclined position. These conveyors are trained about upwardly-inclined rollers 92 and 93, which are journaled in longitudinal beams 94, the latter in turn being supported by columns 95. Rollers 93 are driven by combined motor and speed-reducing mechanisms 96 upon a platform 97. The inner reaches of the conveyors are so spaced as lightly to engage the side walls of the pans and as they travel forwardly the pans are gradually lifted from the tiles or plates contained therein.

The pans at the forward ends of the conveyors are released and fall upon the upper reach 98 of a conveyor 99, which as shown in Figure 2 encircles conveyor 83. Conveyor 99, at opposite extremities, is trained about rollers 101 and 102, the latter of which is driven at appropriate speed by means of combined motor and speed-reducing mechanism 103, which has a driving connection to the roller comprising chain 104 trained about sprocket 106, upon the shaft of the roller.

The tiles upon the conveyor 83, after removal of the pans 60, are carried through a reheating tunnel kiln 107 which encloses the forward portion of the conveyor and which is provided with burners 108.

At the forward limit of travel of the conveyor, the tiles are transversely removed therefrom by mechanism including a cylinder 109, which is supplied with fluid under pressure by means of conduits 111. The cylinder is further provided with a piston 112, which is hollow and at its rear extremity is provided with inlet and outlet conduits 113 for a fluid cooling medium. A slot or opening 114 is formed in the wall of kiln 107 opposite to piston 112 and adjacent to the opening is disposed a platform comprising a grid or grill 116 of bars along which the bodies are slid by the piston.

Glazing material in dry, pulverized form is spread in a thin layer upon the heated bodies by means of a mechanism which includes a feed hopper 117 (shown in Fig. 3) supported upon a framework 118, which in turn rests upon an annealing kiln 119, perpendicular to kiln 107. A horizontal feed chute 121 receives the glazing material from the hopper 117, the chute being supported upon a pair of parallel springs 122, which are suitably vibrated by an electrical vibrator 123, secured to one of the springs. The forward extremity of the chute discharges into a vertical chute 124, suitably secured to frame 118, and at the lower extremity of the vertical chute the material is discharged upon the bodies as they are advanced by the plunger 112. Any glazing material not falling upon the body drops through the grid work without melting and is received in a pan 126 which may be removed from time to time and emptied.

Bodies, after the application of the glaze thereto, are received upon a conveyor 127, which is similar to conveyor 83 and is trained about rollers 128 and 129, journaled in bearings in kiln 119 or the frame thereof. The latter roller is driven by suitable motor mechanism 131.

In the operation of this embodiment of the invention, assuming that the burners in the block 28 are lighted to heat the mold to operating temperature (about 1200° F.), trays or pans 60 are charged with an appropriate amount of waste sand, usually containing 75 or 80 per cent of very finely divided silica thoroughly admixed with 15 or 18 per cent of glass. The sand is levelled off and covered with cover plates 62, and the pans are slipped into the furnace 63. Rod 65 is then reciprocated and oscillated by means of pistons 67 and 72, to advance the trays through the furnace to heat them to a temperature of about 1600 or 1700° F., and finally to slide them across plate 38 upon follower plate 44, while the cross-head 23 is in lowered or retracted position. Upon admission of fluid to the cylinders 19 the cross-head 23 is elevated. Initially the rod 43 and follower plate 44 remain stationary, but as the cross-head travels upwardly, eventually the plate rests upon the bottom of the mold 36 and then travels upwardly therewith. Finally the mold receives the plunger 58 and as it attains the limit of its travel the latter is forced against the bottom of the boss 52. The material in the pan is thus compressed by the plunger.

The degree of pressure exerted by the plunger may be varied over a considerable range. However, satisfactory results are then obtained by application of pressures of about 5000 or 6000 pounds per sq. inch. Of course, the maximum pressure is dictated solely by the capacity of the machine and considerations of economy in power consumption. Lower pressures may under some conditions be employed but probably should not fall below about 1000 pounds per sq. inch. The period of compression in the mold may be brief, for example, 1 to 10 seconds. Application of one or a plurality of hammer-like impacts is also contemplated.

After the waste material has been formed and consolidated in the mold, the cross-head 23 is lowered first to retract the plunger 58 and then to cause the rod 43 to engage the head of screw 47, to lift follower plate 44, together with the pan 60 from the mold. When the upper face of the follower reaches the level of the top of the mold, fluid under pressure is admitted to cylinder 77, thus actuating plunger 79 and forcing the tray or pan 60 and the body contained therein from the press.

The pans, while the bodies therein are still at a temperature probably of 1200 to 1400° F., drop over the edge of the press, striking bar 81 in their descent and being upset thereby to fall face downward upon the conveyor 83. The body within the pan either drops from the bottom immediately upon impact of the pan with the conveyor, or after cooling for a short time upon the latter. The cooling operation may be accelerated by application of blasts of air from the conduits 90. When a body has been loosened within the pan the latter is engaged by the faces of the conveyors 91 and is gradually elevated from the body by the latter. Ultimately the conveyors release the pans and permit them to drop on the laterally-extending conveyor 99, which carries them away.

The bodies after removal of the pans or trays are carried by the conveyor 83 through the reheating kiln or furnace 107 where the temperature is raised to the value required for application of a glaze thereto. The reheated bodies are pushed from the forward extremity of the conveyor 83 by a thrust from the plunger or piston 112 and are carried by the latter across the grid 114, and after passage under the chute 124 to receive a thin layer of pulverized glazing materials, are pushed upon conveyor belt 127 for passage through the annealing leer 119.

The bodies after emergence from the leer will be found to be adequately coated with a uniform film of glazing material. They are characterized by great mechanical strength (about twice that of ordinary bodies of burned clay) and are somewhat heavier than the latter. They may be employed for practically any of the purposes for which conventional clay bodies are employed.

In the form of the invention disclosed in Figure 9 the cover plates in the trays or pans 60 are removed immediately after the pressing operation and the glazing material is applied while the body is still within the pan and before it has had time to cool below a satisfactory glazing temperature. The necessity of reheating the bodies for the application of a glaze is thus obviated.

The construction involves a press 135 similar to the press 15 already described. In this construction the plunger 136 corresponding to plunger 58 is of slightly concave form and rod 137 corresponding to rod 56 is tubular and is connected by a conduit 138 to a suitable source of vacuum (not shown). It will be observed that the edges of the cover plate 139 employed with the tray 141 corresponding to cover 61 has slightly downwardly curved edges 142, which function to provide rounded corners about the face of the body within the pan.

In the operation of this embodiment of the invention, as the plunger 136 is retracted, vacuum is applied to the cover 139 to lift the latter from the pan. The pan containing the body therein is pushed from the follower plate 143 corresponding in all details to plate 44, by means of a pusher head 144, which is connected by means of rod 146 to a suitable piston (not shown). While the head is being retracted, the vacuum in plunger 136 is released to drop cover 139 thereupon.

A grid 147 corresponding to grid 114 is disposed upon the opposite side of the press from pusher head 144 to receive the freshly formed bodies while they are still contained in the trays or pans. While the bodies are traversing the grid a thin coating of pulverized dry glazing material is deposited thereon through a vertical chute 148, supplied by suitable mechanism corresponding to that disclosed in connection with the form of the invention previously described.

The bodies while still in the pans are pushed from the grid upon a conveyor 149, corresponding to the annealing conveyor 119 and are carried by the latter through an annealing chamber 151 which corresponds to chamber 119.

What I claim is:

1. A process of forming a ceramic body, which process comprises placing a predetermined quantity of a mixture comprising about 75 to 80 per cent of finely-divided silica and about 15 to 25 per cent of finely-divided glass in a pan of substantially the same cross-sectional dimensions as the body to be formed, and consisting of relatively thin, heat-resistant sheet metal, preliminarily heating the mixture in the pan to a temperature above the point of sintering of the glass, but not substantially above 1700° F. to sinter the glass, putting the pan with the heated mixture therein in a strong mold having side walls defining a chamber of substantially the same cross-sectional dimensions as the pan and subjecting the mass while relatively loose and uncompacted to intense mechanical pressure, in order to consolidate the material into strongly coherent state, removing the pan and the pressed body therein from the mold, cooling them and taking the body from the pan.

2. A process of forming a ceramic body from a mixture of finely-divided silica and glass having the characteristics of waste sand from the smoothing of glass surfaces with a slurry of sand as an abrasive, which process comprises placing the mixture in appropriate amount in a pan consisting of relatively thin, flexible, heat-resistant sheet metal, preliminarily heating the material in the pan to a temperature above that of sintering of the glass content of the material, but below that in which the material as a whole tends to flow as a fluid under mechanical pressure, then placing the pan containing the material in loose, uncompacted but heated state in a relatively rigid mold which has side walls enclosing and closely fitting the side walls of the pan and subjecting the material to intense mechanical pressure, in order to consolidate the material into a coherent body, removing the pan from the mold, then removing the formed body from the pan.

3. A process as defined in claim 1 in which the material in the pan is heated to a temperature of about 1600 to 1700 degrees F.

4. A process as defined in claim 1 in which the material is preheated to about 1600 to 1700 degrees F. and the mold is heated to a temperature of about 1200 degrees F.

5. A process of forming a glazed ceramic body from a mixture of finely-divided silica and glass, said mixture comprising about 10 to 25 per cent of glass, the rest being substantially silica, which method comprises placing the mixture in a pan consisting of thin, flexible, heat-resistant sheet metal, preliminarily heating the material to a temperature above that of sintering of the glass, but below that at which the material as a whole will flow under mechanical pressure, then placing the pan in a mold with the sand in loose and uncompacted state, the mold being substantially of the same cross-sectional outline as the pan, then subjecting the material in the pan to intense mechanical pressure applied to the upper surface of the material to consolidate it into a coherent mass, removing the pan from the mold, applying glazing material to the surface of the mass in the pan and then annealing the resultant body.

6. A process as defined in claim 5 in which the material in the pan is covered preliminarily to pressing with a metallic cover, and the metallic cover is removed before application of the glazing material.

HENRY J. GALEY.